(12) United States Patent
Ong et al.

(10) Patent No.: US 8,190,575 B1
(45) Date of Patent: May 29, 2012

(54) DISK DRIVE MAINTAINING MULTIPLE COPIES OF CODE SEGMENTS

(75) Inventors: Choo-Bhin Ong, Irvine, CA (US);
An-Chieh Chang, Irvine, CA (US);
Raffi Codilian, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 705 days.

(21) Appl. No.: 12/199,091

(22) Filed: Aug. 27, 2008

(51) Int. Cl.
*G06F 17/30* (2006.01)

(52) U.S. Cl. ........ 707/650; 707/653; 707/654; 707/685; 707/686; 707/640; 714/25; 714/26; 714/14; 714/15; 714/21

(58) Field of Classification Search .............. 713/2, 300, 713/3; 714/5, 14, 6, 15, 21; 707/600, 640–656, 707/674–678, 685–686
See application file for complete search history.

(56) References Cited

U.S. PATENT DOCUMENTS

| | | | |
|---|---|---|---|
| 5,392,290 A | | 2/1995 | Brown et al. |
| 5,729,696 A * | | 3/1998 | Goodwin et al. ............... 705/22 |
| 5,895,493 A | | 4/1999 | Gatica |
| 5,966,732 A | | 10/1999 | Assaf |
| 6,167,494 A | | 12/2000 | Cheston et al. |
| 6,185,678 B1 * | | 2/2001 | Arbaugh et al. ................... 713/2 |
| 6,279,117 B1 * | | 8/2001 | Takeda ............................ 714/5.1 |
| 6,320,718 B1 | | 11/2001 | Bouwkamp et al. |
| 6,384,999 B1 | | 5/2002 | Schibilla |
| 6,513,135 B2 | | 1/2003 | Harada |
| 6,560,701 B1 | | 5/2003 | Berstis et al. |
| 6,650,492 B2 | | 11/2003 | Lenny et al. |
| 6,728,830 B1 | | 4/2004 | Assaf |
| 6,732,124 B1 * | | 5/2004 | Koseki et al. ........................ 1/1 |
| 6,760,823 B1 * | | 7/2004 | Schutzman ................... 711/162 |
| 6,868,496 B2 | | 3/2005 | Sales et al. |
| 6,880,102 B1 * | | 4/2005 | Bridge .......................... 714/6.12 |
| 6,883,073 B2 * | | 4/2005 | Arakawa et al. ............... 711/162 |
| 6,944,789 B2 * | | 9/2005 | Kodama ............................. 714/5 |
| 6,963,951 B2 | | 11/2005 | Ng et al. |
| 7,051,233 B2 * | | 5/2006 | Fukumori et al. ............... 714/14 |
| 7,139,145 B1 | | 11/2006 | Archibald et al. |
| 7,173,782 B2 | | 2/2007 | Ikeda et al. |
| 7,219,257 B1 | | 5/2007 | Mahmoud et al. |
| 7,296,142 B2 | | 11/2007 | Lim et al. |
| 7,302,579 B1 | | 11/2007 | Cain et al. |
| 7,313,725 B2 | | 12/2007 | Kroening et al. |
| 7,360,113 B2 * | | 4/2008 | Anderson et al. ............... 714/5.1 |
| 7,613,946 B2 * | | 11/2009 | Ashton et al. ................. 714/6.12 |
| 7,707,184 B1 * | | 4/2010 | Zhang et al. ................... 707/645 |
| 2003/0217300 A1 * | | 11/2003 | Fukumori et al. ............. 713/300 |
| 2003/0229819 A1 * | | 12/2003 | Kodama ............................. 714/5 |
| 2003/0236956 A1 * | | 12/2003 | Grubbs et al. ................. 711/162 |
| 2005/0010620 A1 * | | 1/2005 | Silvers et al. .................. 707/205 |
| 2005/0021919 A1 | | 1/2005 | Kroening |

(Continued)

*Primary Examiner* — Frantz Coby

(57) ABSTRACT

A disk drive is disclosed comprising a disk, and a head actuated over the disk. Control circuitry within the disk drive is operable to write a plurality of code segments to a primary area of the disk, and write the code segments to a backup area of the disk. The control circuitry reads the code segments from the primary area of the disk and executes the code segments read from the primary area of the disk. After reading the code segments from the primary area of the disk and executing the code segments, the control circuitry verifies recoverability of the code segments from the backup area of the disk, and when the verification fails, copies the code segments from the primary area of the disk to the backup area of the disk.

24 Claims, 13 Drawing Sheets

U.S. PATENT DOCUMENTS

| | | |
|---|---|---|
| 2005/0027935 A1 | 2/2005 | Yeo |
| 2005/0108485 A1* | 5/2005 | Perego .......................... 711/162 |
| 2005/0216681 A1* | 9/2005 | Micka et al. .................. 711/162 |
| 2005/0246401 A1* | 11/2005 | Edwards et al. .............. 707/205 |
| 2006/0041738 A1* | 2/2006 | Lai .................................. 713/2 |
| 2006/0248295 A1* | 11/2006 | Uchiyama et al. ............ 711/162 |
| 2007/0011493 A1 | 1/2007 | Du et al. |

* cited by examiner

DISK DRIVE MAINTAINING MULTIPLE COPIES OF CODE SEGMENTS

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

The disk drive comprises control circuitry including a microprocessor for executing code segments to carry out access operations received from a host. The code segments are stored in a reserved area of the disk and read into a volatile semiconductor memory (e.g., a DRAM) when the disk drive is powered on. Prior art disk drives store a primary copy of the code segments in a primary area of the disk, and a backup copy of the code segments in a backup area of the disk. If an error occurs while reading the primary copy of code segments from the primary area of the disk, the backup copy of code segments are read from the backup area of the disk and copied to the primary area of the disk. However, if the backup copy of code segments becomes unrecoverable due, for example, to a grown defect, it typically renders the disk drive inoperable.

DETAILED DESCRIPTION OF EMBODIMENTS OF THE INVENTION

Figure 1A:
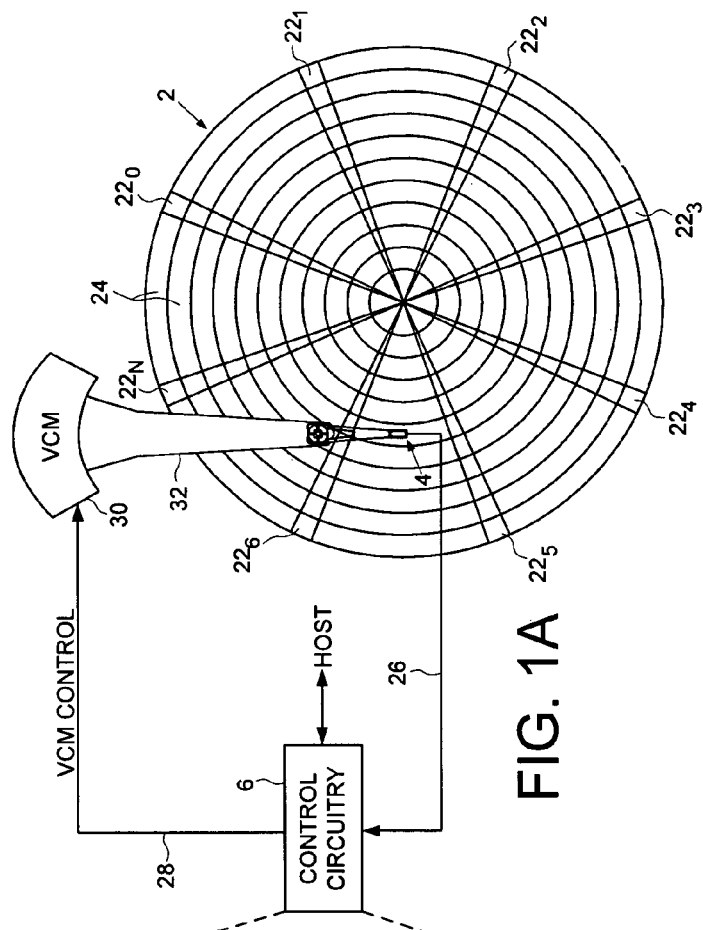
FIG. 1A shows a disk drive according to an embodiment of the present invention comprising a disk, a head actuated over the disk, and control circuitry.
Figure 1B:
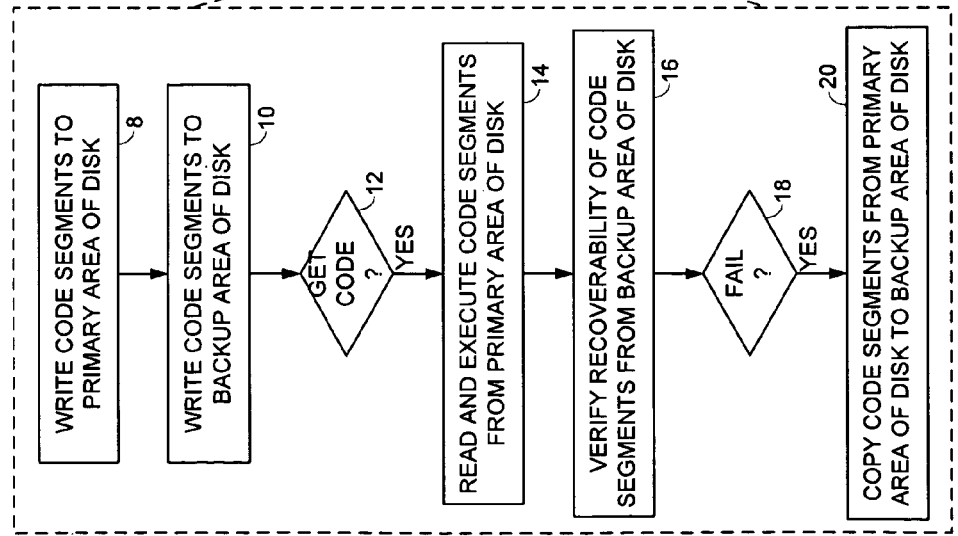
FIG. 1B is a flow diagram executed by the control circuitry according to an embodiment wherein code segments from a primary area of the disk are copied to a backup area of the disk.

FIG. 1A shows a disk drive according to an embodiment of the present invention comprising a disk 2, a head 4 actuated over the disk 2, and control circuitry 6. FIG. 1B is a flow diagram executed by the control circuitry 6 wherein code segments are written to a primary area of the disk (step 8) and are also written to a backup area of the disk (step 10). When the control circuitry is ready to access the code segments (step 12), the code segments are read from the primary area of the disk and executed by the control circuitry (step 14). Thereafter, the control circuitry verifies the recoverability of the code segments from the backup area (step 16). When the verification fails (step 18), the control circuitry copies code segments from the primary area to the backup area (step 20).

In the embodiment of FIG. 1A, the disk 2 comprises a plurality of embedded servo sectors $22_0$-$22_N$ which define a number of data tracks 24. Each servo sector 22 comprising coarse head positioning information (e.g., a track address) and fine head positioning information (e.g., servo bursts). The control circuitry 6 processes the read signal 26 to demodulate the servo sectors $22_0$-$22_N$ into a position error signal representing an error between a current radial location of the head 4 and a target radial location. The control circuitry 6 filters the position error signal with a suitable compensation filter to generate a control signal 28 applied to a voice coil motor (VCM) 30 which rotates an actuator arm 32 about a pivot in a direction that reduces the position error signal.

The code segments may be accessed by the control circuitry in connection with any suitable operating mode, such as when the disk drive needs to access boot code segments when initially powered on. In an alternative embodiment, when the disk drive enters a particular operating mode (e.g., entering a performance mode) corresponding code segments may need to be read from the disk and executed.

Figure 2:
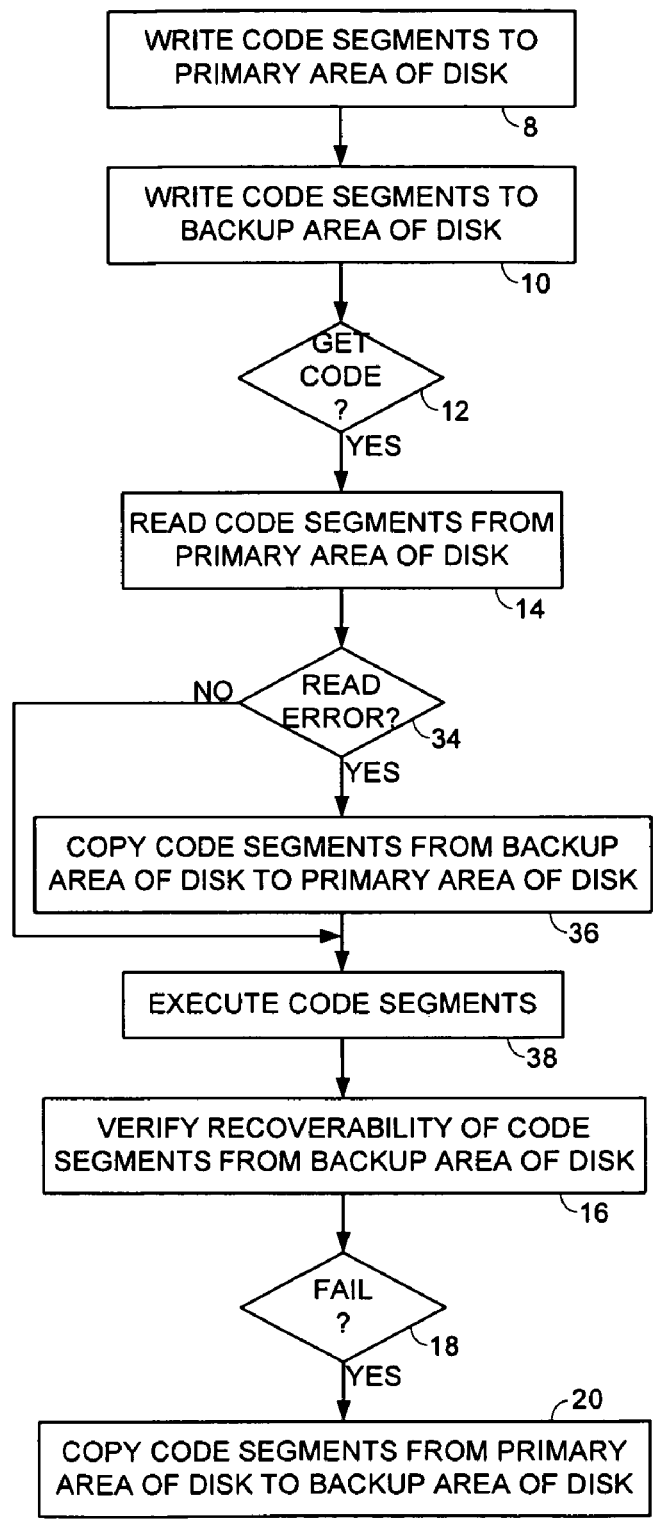
FIG. 2 is a flow diagram executed by the control circuitry according to an embodiment wherein code segments are copied from the backup area to the primary area when reading from the primary area fails.

FIG. 2 is a flow diagram according to an embodiment of the present invention which expands the flow diagram of FIG. 1B. If an error occurs while reading the code segments from the primary area (step 34), then the code segments are copied from the backup area to the primary area (step 36). The code segments read from both the primary and secondary areas are executed (step 38). When the code segments are accessed again, the control circuitry first attempts to read the code segments from the primary area.

Figure 3:
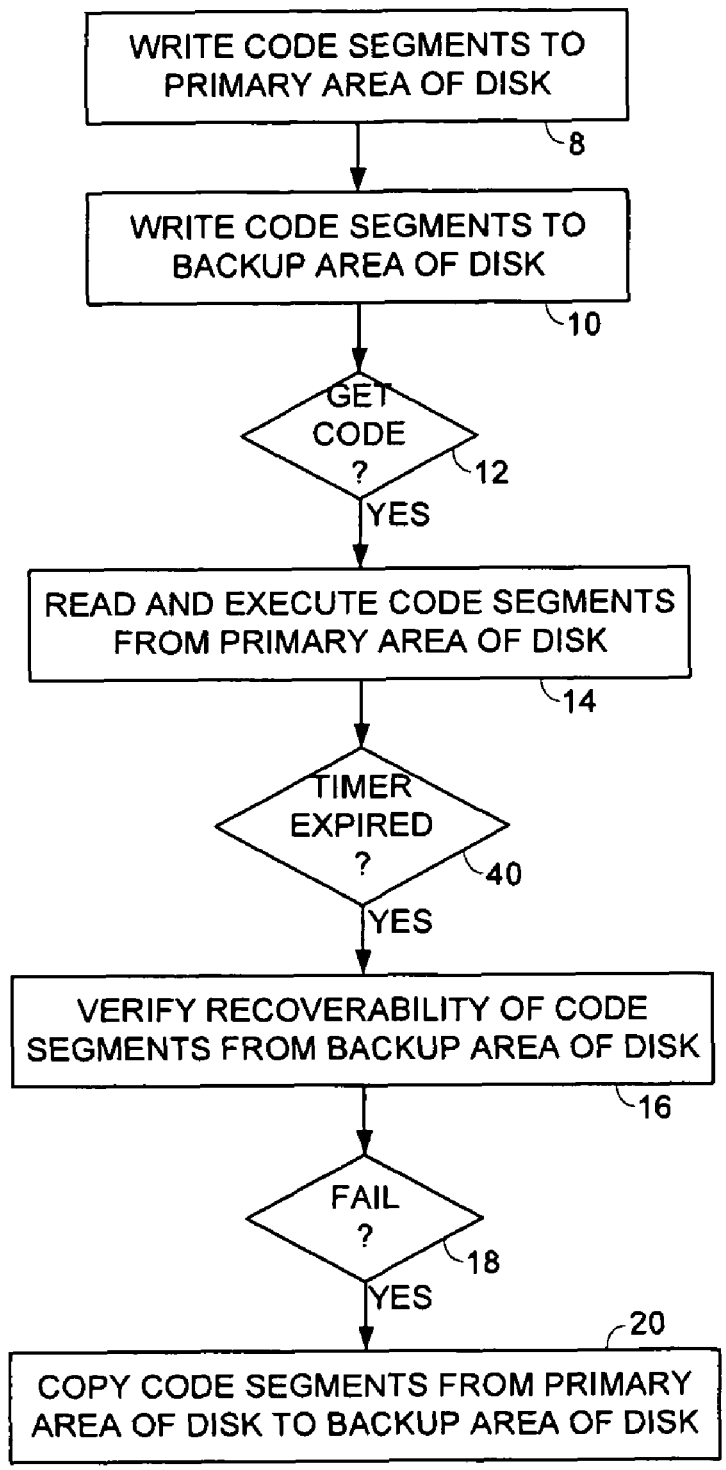
FIG. 3 is a flow diagram executed by the control circuitry according to an embodiment wherein the code segments in the backup area are verified periodically.

FIG. 3 is a flow diagram according to an embodiment of the present invention which expands the flow diagram of FIG. 1B wherein the control circuitry periodically verifies recoverability of the code segments from the backup area. For example, the control circuitry may verify the recoverability of the code segments from the backup area when a timer expires (step 40). The timer may track any suitable interval, and in one embodiment, the interval may span the time when the disk drive is powered off. This embodiment may help prevent the backup area from becoming unrecoverable due to degradation of the recorded data over time (magnetic entropy).

Figure 4:
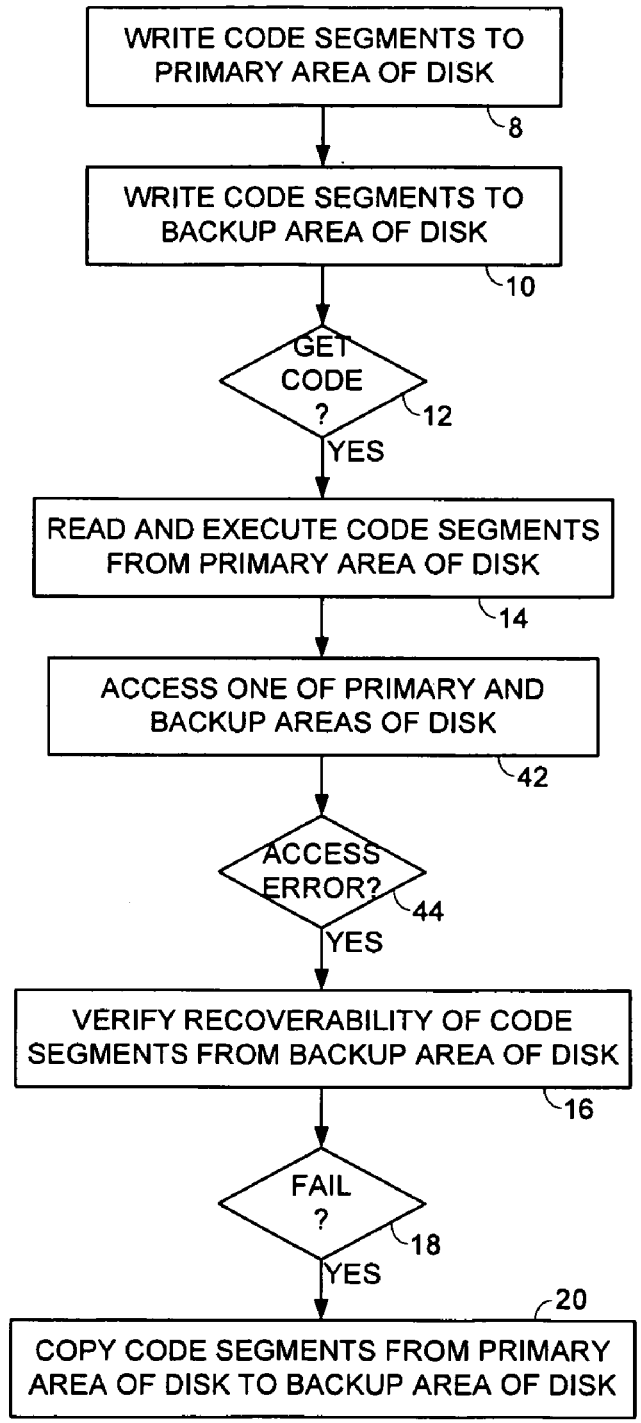
FIG. 4 is a flow diagram executed by the control circuitry according to an embodiment wherein the code segments in the backup area are verified when an error occurs while accessing one of the primary and backup areas.

FIG. 4 is a flow diagram according to an embodiment of the present invention which expands the flow diagram of FIG. 1B. If the control circuitry attempts to access one of the primary and secondary areas (step 42) and there is an error (step 44), then the control circuitry verifies recoverability of the code segments from the backup area. For example, in embodiments described below, a read error may occur if a number of bit errors detected exceeds a threshold, or a write error may occur if the position error signal generated from reading the servo sectors exceeds a threshold.

Figure 5:
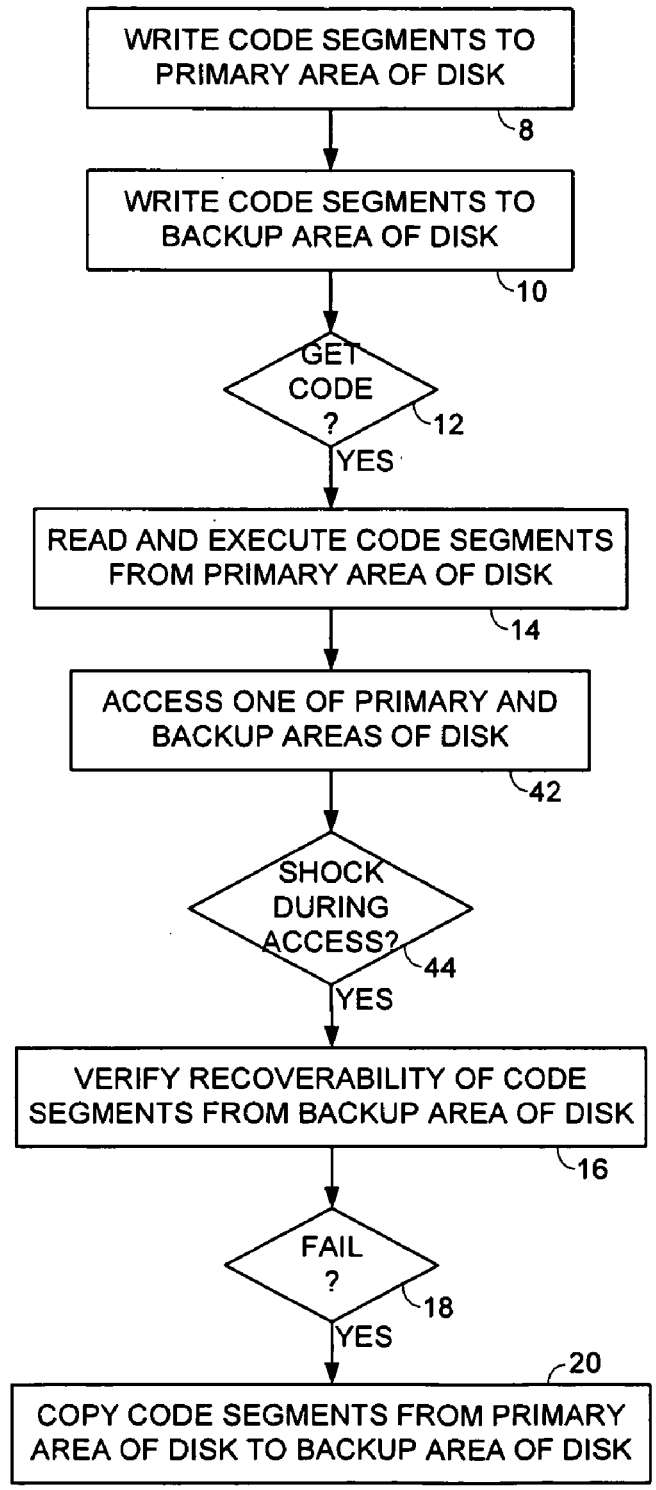
FIG. 5 is a flow diagram executed by the control circuitry according to an embodiment wherein the code segments in the backup area are verified when a shock occurs while accessing one of the primary and backup areas.

In an embodiment shown in FIG. 5, the control circuitry may verify the recoverability of the backup area if a shock event is detected (step 44) while accessing at least one of the primary area and the backup area. In one embodiment, the control circuitry may verify recoverability of both the primary area and the backup area if a shock event is detected when accessing either area. When a shock event is detected, particularly when writing data to the disk, it becomes more likely that the shock event may degrade the area being accessed. Therefore, if a shock event is detected while accessing the primary area, the primary area may be verified and then the backup area may be verified to ensure recoverability even if the primary area passes the verification. The shock event may be detected in any suitable manner, such as by evaluating the position error signal generated when reading the servo sectors, or with a mechanical sensor (e.g., an accelerometer).

Figure 6:
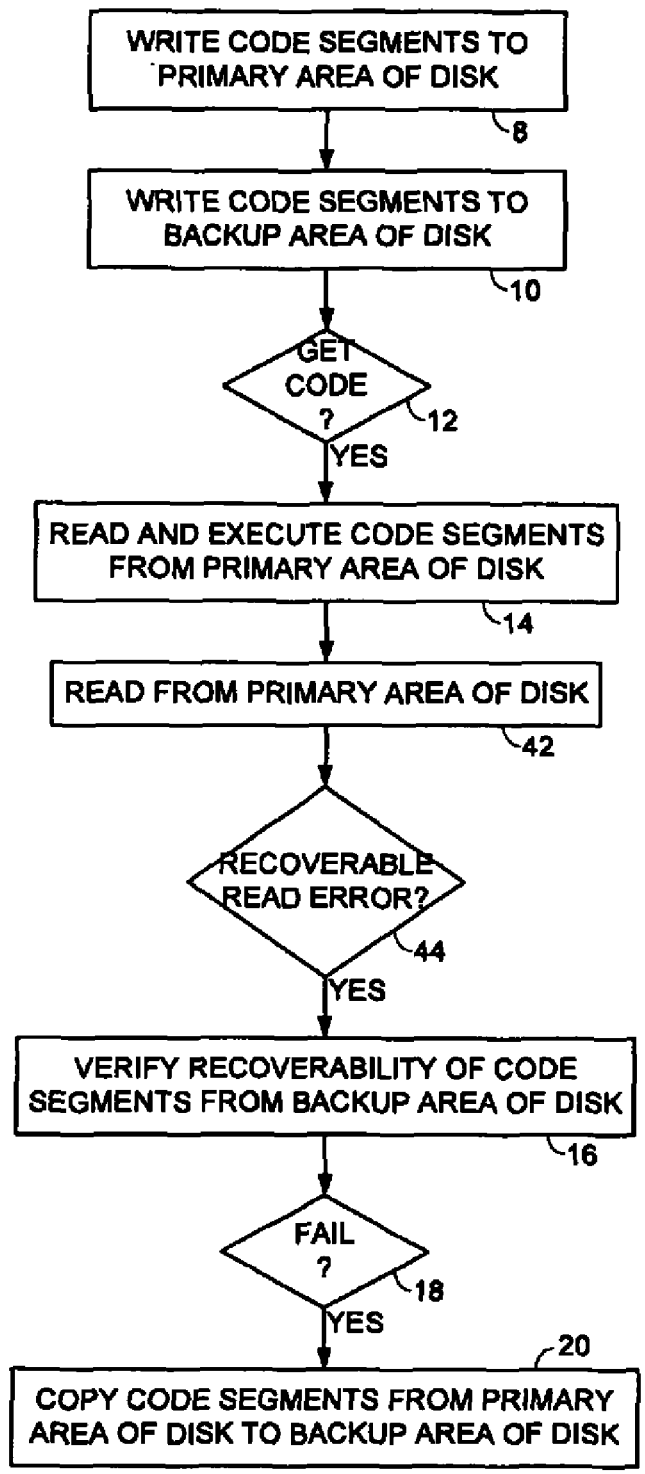
FIG. 6 is a flow diagram executed by the control circuitry according to an embodiment wherein the code segments in the backup area are verified when a read error occurs while reading data from the primary area of the disk.

FIG. 6 is a flow diagram according to an embodiment of the present invention which expands the flow diagram of FIG. 1B. If the control circuitry executes a read operation to read data from the primary area (step 42), and an error is detected during the read operation (step 44), then the control circuitry verifies recoverability of the backup area. Any suitable error may be detected, for example, if the number of bit errors detected using an error correction code exceeds a threshold indicating that a data sector may be degrading due to a growing defect. Therefore, the backup area is verified to ensure that it can still be accessed in the event that the primary area becomes unrecoverable.

Figure 7:
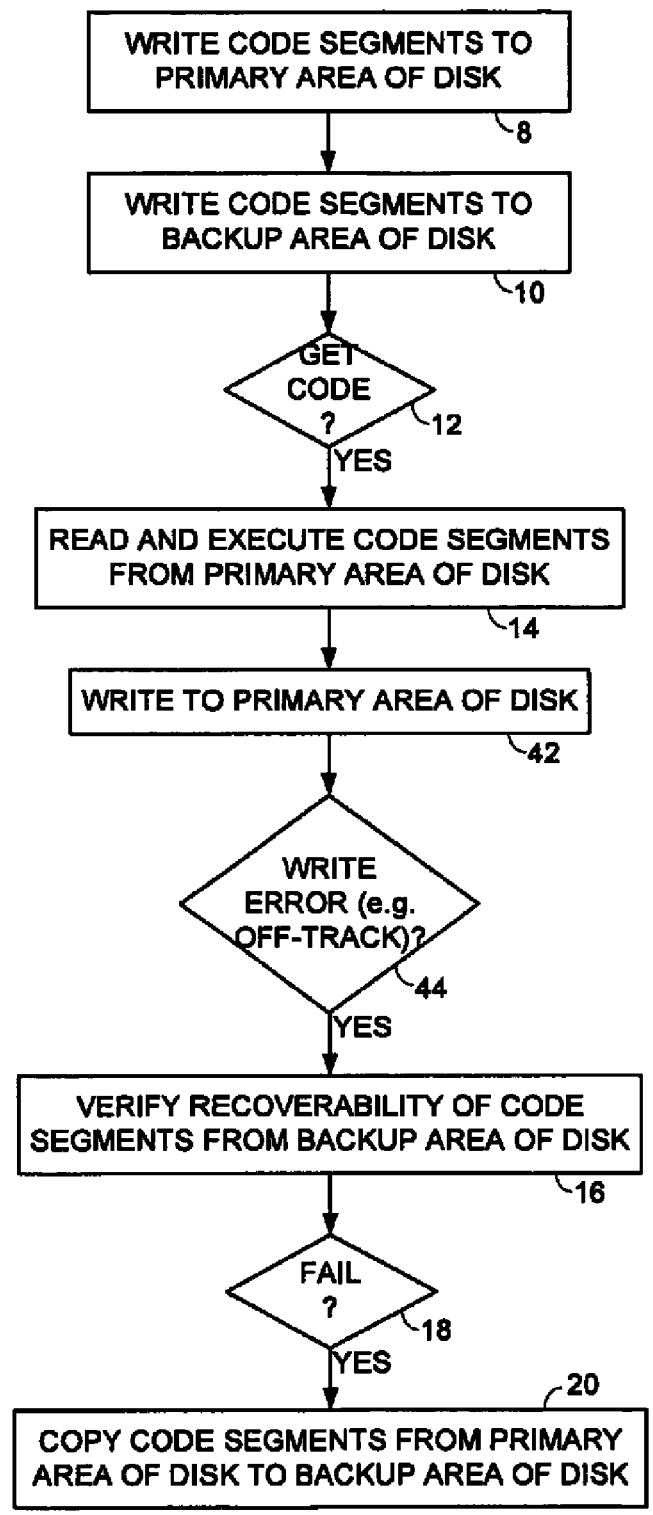
FIG. 7 is a flow diagram executed by the control circuitry according to an embodiment wherein the code segments in the backup area are verified when a write error occurs while writing data to the primary area of the disk.

FIG. 7 is a flow diagram according to an embodiment of the present invention which expands the flow diagram of FIG. 1B. If the control circuitry executes a write operation to write data to the primary area (step 42), and an error is detected during the write operation (step 44), then the control circuitry verifies recoverability of the backup area. Any suitable error may be detected, for example, if the position error signal generated from reading the servo sectors exceeds a threshold indicating a potential problem when attempting to read the servo data. Therefore, the backup area is verified to ensure that it can still be accessed in the event that the primary area becomes unrecoverable.

Figure 8:
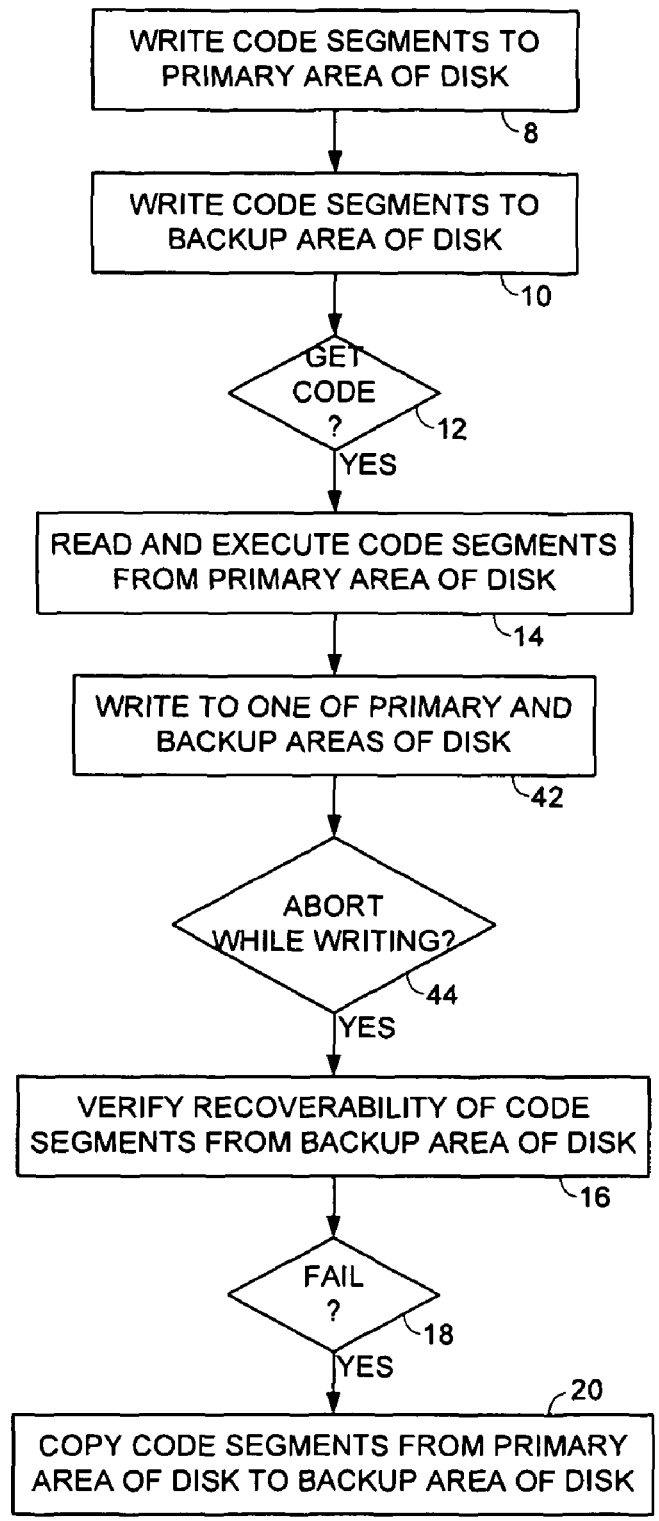
FIG. 8 is a flow diagram executed by the control circuitry according to an embodiment wherein the code segments in the backup area are verified when a write operation to one of the primary and backup areas is aborted.

FIG. 8 is a flow diagram according to an embodiment of the present invention which expands the flow diagram of FIG. 1B. If the control circuitry executes a write operation to write data to one of the primary area and backup area (step 42), and the write operation is aborted (step 44), then the control circuitry verifies recoverability of the backup area. The write operation may be aborted for any suitable reason, such as an excessive position error signal generated from reading the servo sectors, which may be caused by the servo sectors degrading over time. Therefore, the backup area is verified to ensure that it can still be accessed in the event that the primary area becomes unrecoverable. In one embodiment, the backup area is verified before attempting to re-execute the write operation to the primary area to ensure the backup area is recoverable before a bad write operation renders the primary area unrecoverable.

Figure 9:
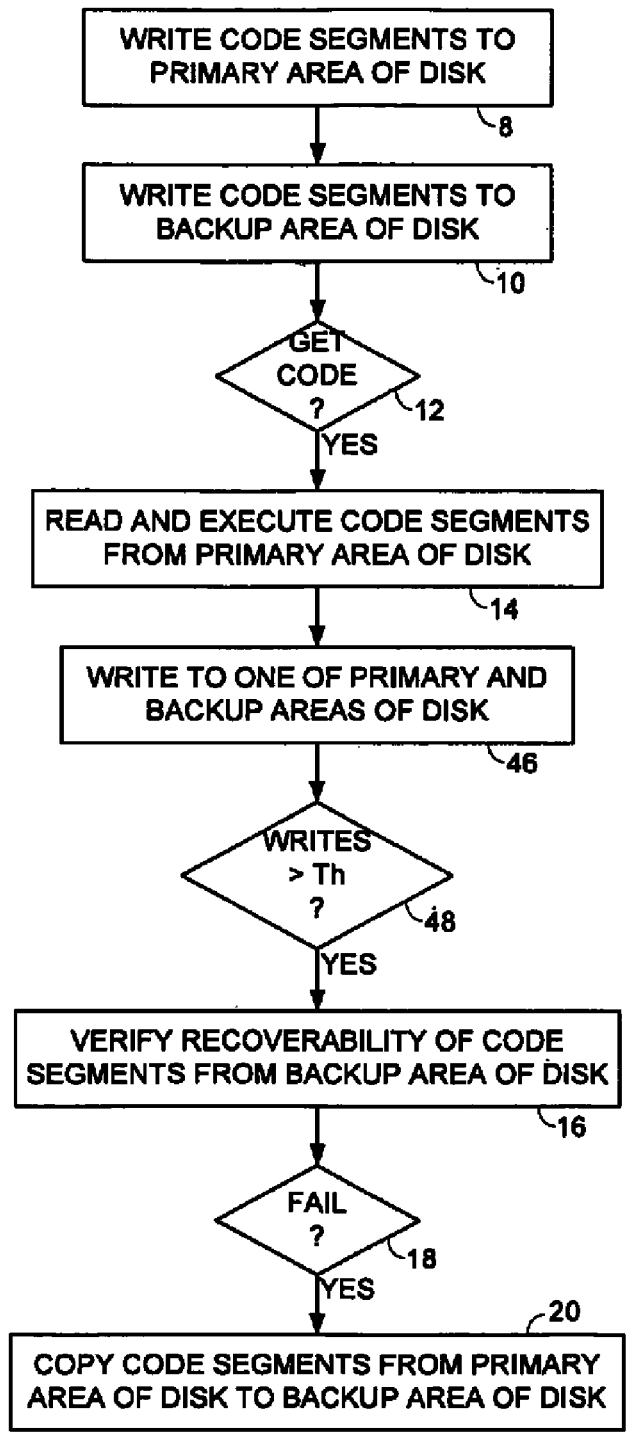
FIG. 9 is a flow diagram executed by the control circuitry according to an embodiment wherein the code segments in the backup area are verified when a number of write operations to one of the primary and backup areas exceeds a threshold.

FIG. 9 is a flow diagram according to an embodiment of the present invention which expands the flow diagram of FIG. 1B. If the control circuitry executes a number of write operations to one of the primary area and backup area (step 46), and the number exceeds a threshold (step 48), then the control circuitry verifies recoverability of the backup area. Write operations can degrade previously written data due to adjacent track interference. Therefore, the backup area is verified to ensure that it can still be accessed in the event either the primary area or backup area are degrading due to excessive write operations.

Figure 10:
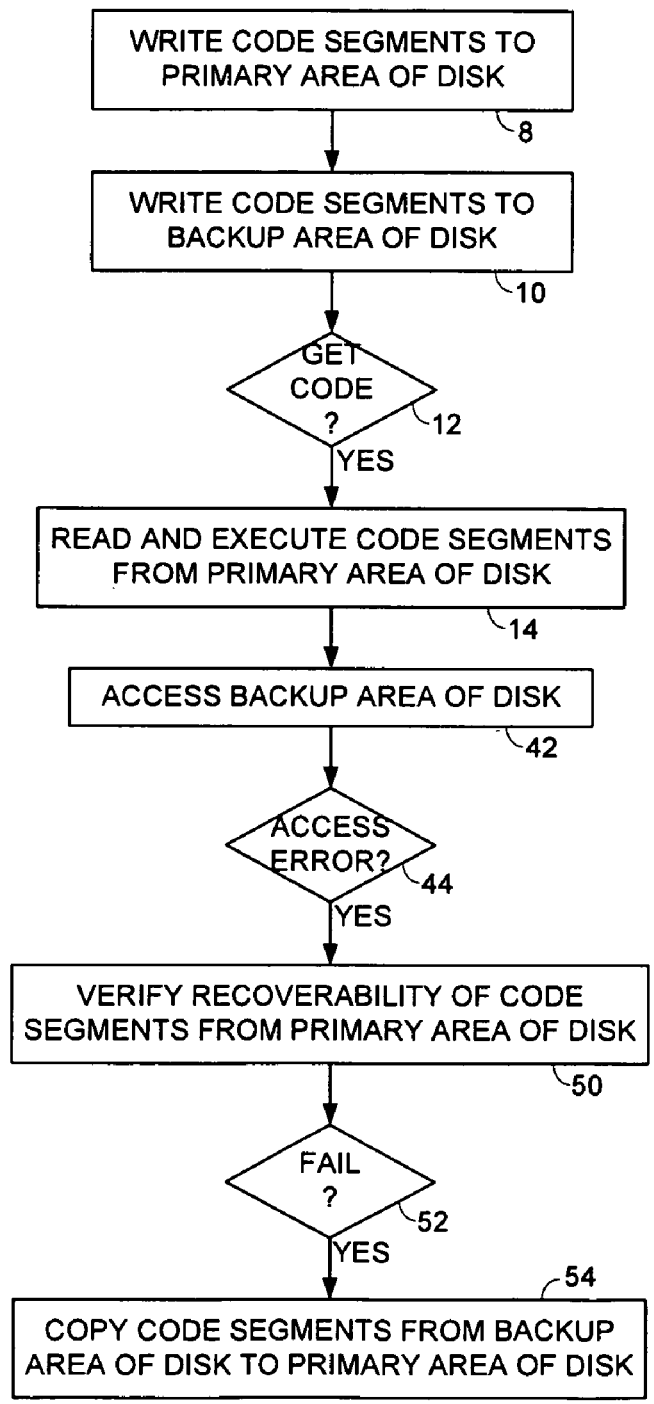
FIG. 10 is a flow diagram executed by the control circuitry according to an embodiment wherein the code segments in the primary area are verified when an error occurs while accessing the backup area.
Figure 11:
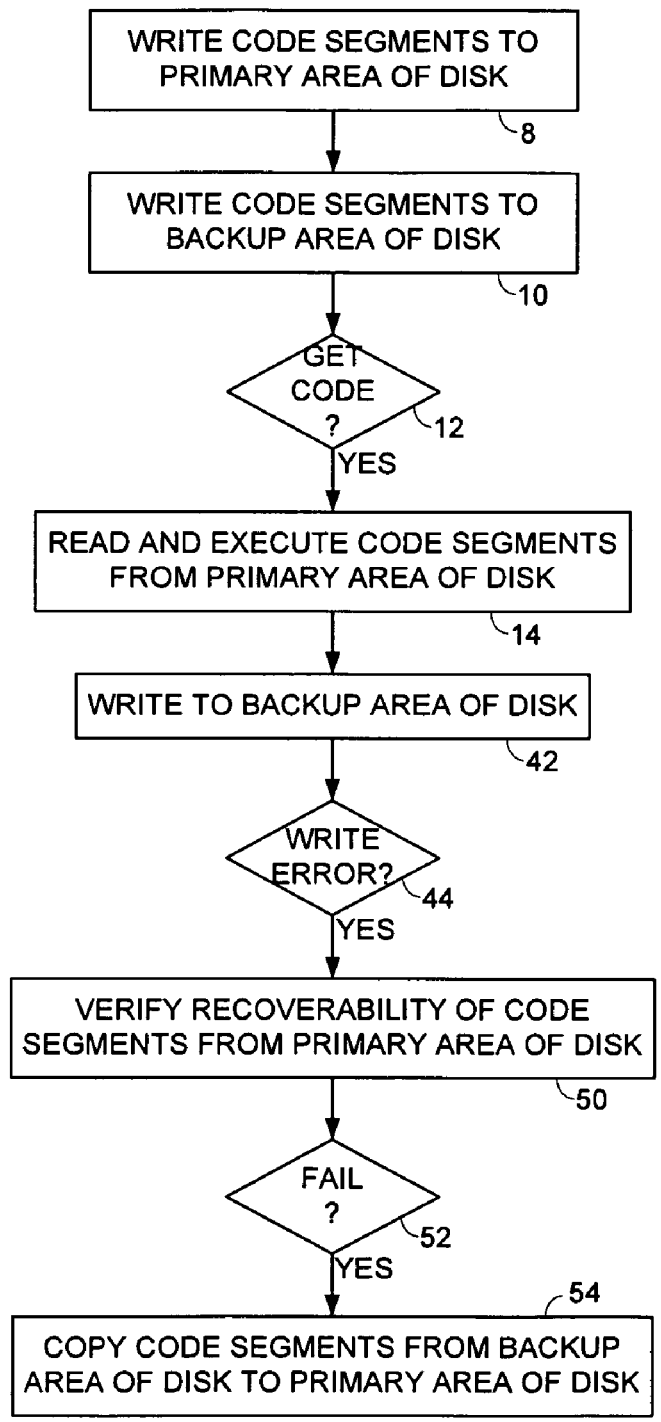
FIG. 11 is a flow diagram executed by the control circuitry according to an embodiment wherein the code segments in the primary area are verified when an error occurs while writing data to the backup area of the disk.
Figure 12:
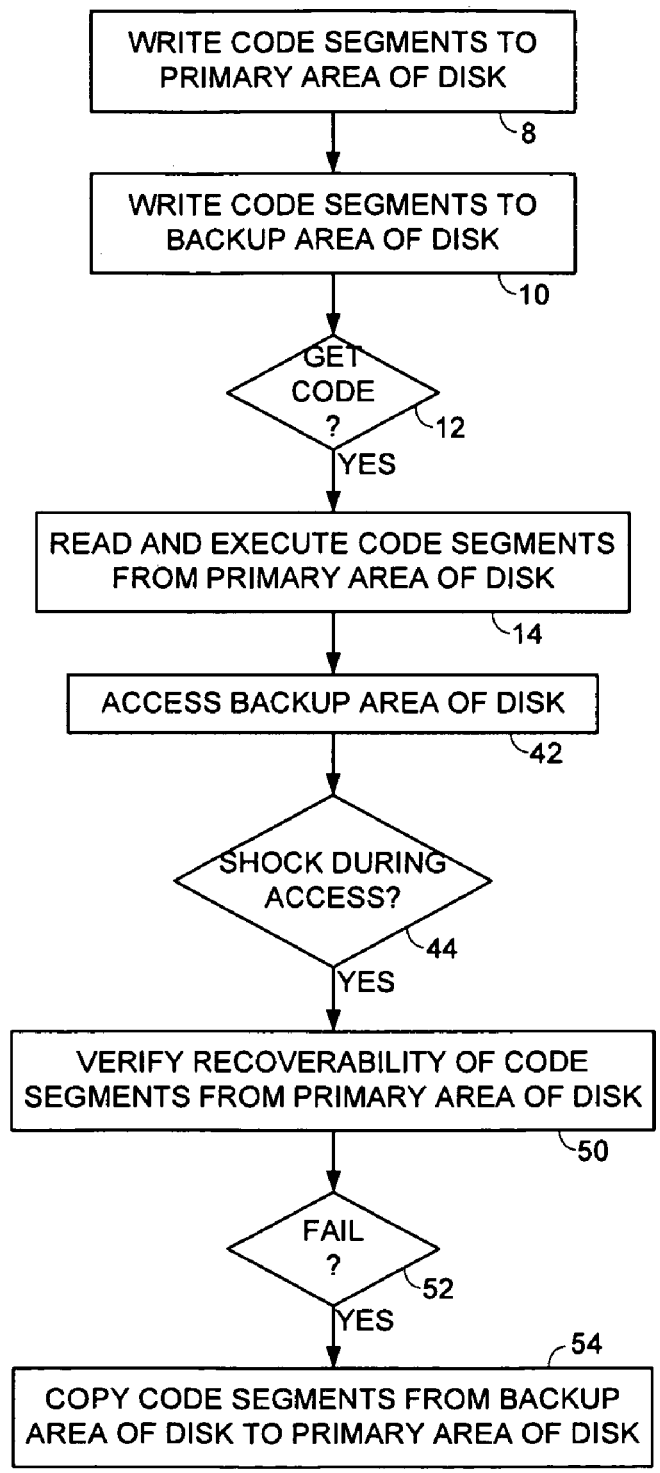
FIG. 12 is a flow diagram executed by the control circuitry according to an embodiment wherein the code segments in the primary area are verified when a shock occurs while accessing the backup area.

FIG. 10 is a flow diagram according to an embodiment of the present invention which expands the flow diagram of FIG. 1B. If the control circuitry attempts to access the backup area (step 42) and there is an error (step 44), then the control circuitry verifies recoverability of the code segments from the primary area (step 50). If the verification fails (step 52) then the code segments are copied from the backup area to the primary area (step 54). For example, in an embodiment shown in FIG. 11 the control circuitry may verify the recoverability of the primary area if an error occurs (step 44) while writing data to the backup area of the disk (step 42). In an embodiment shown in FIG. 12, the control circuitry may verify the recoverability of the primary area if a shock is detected (step 44) while accessing the backup area.

Figure 13:
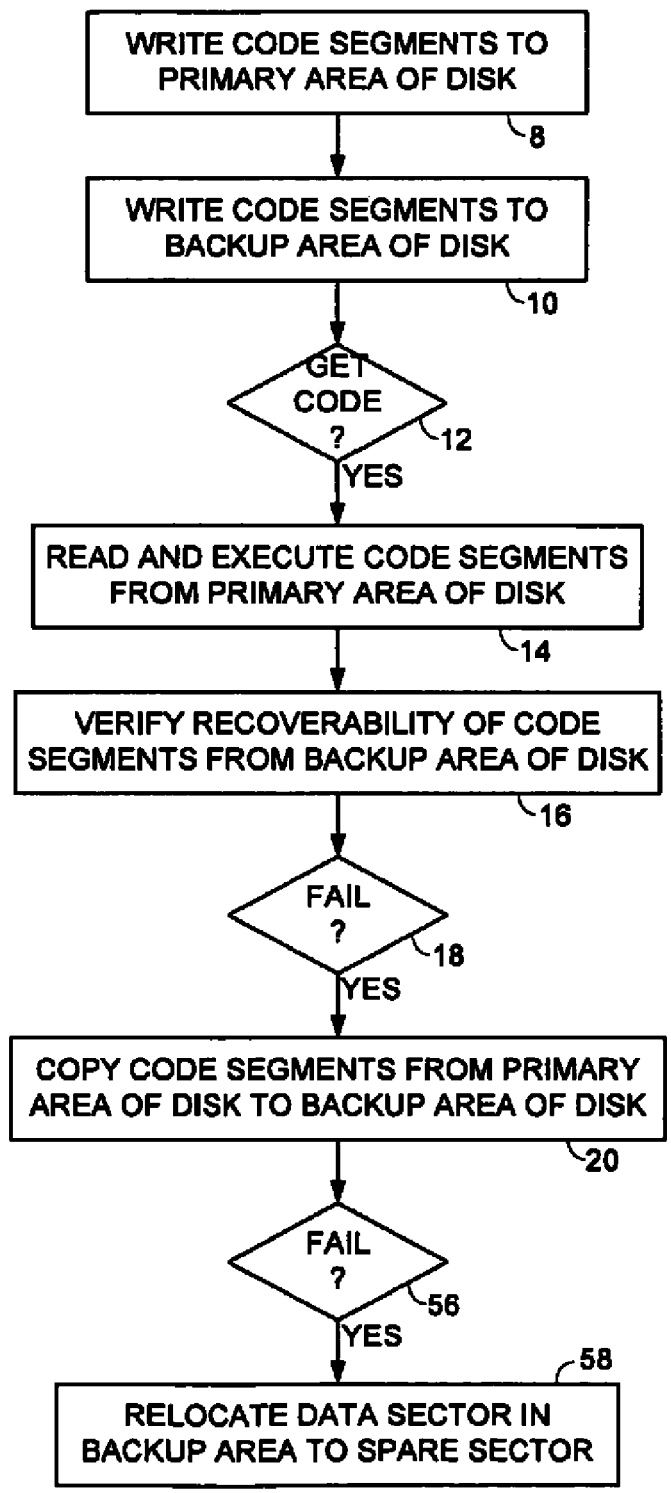
FIG. 13 is a flow diagram executed by the control circuitry according to an embodiment wherein when data cannot be copied from the primary area to the backup area due to a defect on the disk, a data sector in the backup area is relocated to a spare sector.

FIG. 13 is a flow diagram according to an embodiment of the present invention which expands the flow diagram of FIG. 1B. When the verification of the backup area fails (step 18), the control circuitry attempts to copy the code segments from the primary area to the backup area (step 20). However, the copy operation may also fail (step 56) if, for example, there is a grown defect in the backup area that renders a data sector within the backup area unusable. An unusable data sector may be detected by performing a write verify operation wherein recoverability of a written data sector is verified after the write operation. When the copy operation fails (step 56), the control circuitry relocates a defective data sector in the backup area to a spare sector in the backup area, and then copies the code segments to the spare sector (step 58).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry operable to:
   write a plurality of code segments to a primary area of the disk;
   write the code segments to a backup area of the disk;
   read the code segments from the primary area of the disk and execute the code segments read from the primary area of the disk;
   after reading the code segments from the primary area of the disk and executing the code segments, verify recoverability of the code segments from the backup area of the disk; and
   when the verification fails, copy the code segments from the primary area of the disk to the backup area of the disk.

2. The disk drive as recited in claim 1, wherein the control circuitry is further operable to periodically verify recoverability of the code segments from the backup area of the disk.

3. The disk drive as recited in claim 1, wherein the control circuitry is further operable to verify recoverability of the code segments from the backup area of the disk when an error occurs while accessing one of the primary area and the backup area of the disk.

4. The disk drive as recited in claim 3, wherein the control circuitry is further operable to verify recoverability of the code segments from the backup area of the disk when a shock event occurs while accessing one of the primary area and backup area of the disk.

5. The disk drive as recited in claim 3, wherein the control circuitry is further operable to verify recoverability of the code segments from the backup area of the disk when an error occurs while reading from the primary area of the disk.

6. The disk drive as recited in claim 3, wherein the control circuitry is further operable to verify recoverability of the code segments from the backup area of the disk when an error occurs while writing to the primary area of the disk.

7. The disk drive as recited in claim 3, wherein the control circuitry is further operable to verify recoverability of the code segments from the backup area of the disk after aborting a write operation to one of the primary area and backup area of the disk.

8. The disk drive as recited in claim 3, wherein the control circuitry is further operable to verify recoverability of the code segments from the backup area of the disk after executing a number of write operations to one of the primary area and backup area of the disk.

9. The disk drive as recited in claim 1, wherein the control circuitry is further operable to verify recoverability of the code segments from the primary area of the disk when an error occurs while accessing the backup area of the disk.

10. The disk drive as recited in claim 9, wherein the control circuitry is further operable to verify recoverability of the code segments from the primary area of the disk when an error occurs while writing to the backup area of the disk.

11. The disk drive as recited in claim 9, wherein the control circuitry is further operable to verify recoverability of the code segments from the primary area of the disk when a shock event occurs while accessing the backup area of the disk.

12. The disk drive as recited in claim 1, wherein when the verification fails, the control circuitry is further operable to:
    relocate a data sector of the backup area to a spare sector of the backup area; and
    copy the code segments from the primary area to the spare sector of the backup area.

13. A method of operating a disk drive, the disk drive comprising a disk, and a head actuated over the disk, the method comprising:
    writing a plurality of code segments to a primary area of the disk;
    writing the code segments to a backup area of the disk;
    reading the code segments from the primary area of the disk and execute the code segments read from the primary area of the disk;
    after reading the code segments from the primary area of the disk and executing the code segments, verifying recoverability of the code segments from the backup area of the disk; and
    when the verification fails, copying the code segments from the primary area of the disk to the backup area of the disk.

14. The method as recited in claim 13, further comprising periodically verifying recoverability of the code segments from the backup area of the disk.

15. The method as recited in claim 13, further comprising verifying recoverability of the code segments from the backup area of the disk when an error occurs while accessing one of the primary area and the backup area of the disk.

16. The method as recited in claim 15, further comprising verifying recoverability of the code segments from the backup area of the disk when a shock event occurs while accessing one of the primary area and backup area of the disk.

17. The method as recited in claim 15, further comprising verifying recoverability of the code segments from the backup area of the disk when an error occurs while reading from the primary area of the disk.

18. The method as recited in claim 15, further comprising verifying recoverability of the code segments from the backup area of the disk when an error occurs while writing to the primary area of the disk.

19. The method as recited in claim 15, further comprising verifying recoverability of the code segments from the backup area of the disk after aborting a write operation to one of the primary area and backup area of the disk.

20. The method as recited in claim 15, further comprising verifying recoverability of the code segments from the backup area of the disk after executing a number of write operations to one of the primary area and backup area of the disk.

21. The method as recited in claim 13, further comprising verifying recoverability of the code segments from the primary area of the disk when an error occurs while accessing the backup area of the disk.

22. The method as recited in claim 21, further comprising verifying recoverability of the code segments from the primary area of the disk when an error occurs while writing to the backup area of the disk.

23. The method as recited in claim 21, further comprising verifying recoverability of the code segments from the primary area of the disk when a shock event occurs while accessing the backup area of the disk.

24. The method as recited in claim 13, wherein when the verification fails, further comprising:

relocating a data sector of the backup area to a spare sector of the backup area; and copying the code segments from the primary area to the spare sector of the backup area.

* * * * *